(12) United States Patent
Bell et al.

(10) Patent No.: US 7,703,806 B2
(45) Date of Patent: Apr. 27, 2010

(54) SEAT BELT SYSTEM FOR A MOTOR VEHICLE

(75) Inventors: John Bell, Carlisle (GB); Martyn Palliser, Carlisle (GB); Ian Hannah, Carlisle (GB)

(73) Assignee: Key Safety Systems, Inc., Sterling Heights, MI (US)

( * ) Notice: Subject to any disclaimer, the term of this patent is extended or adjusted under 35 U.S.C. 154(b) by 294 days.

(21) Appl. No.: 11/687,148

(22) Filed: Mar. 16, 2007

(65) Prior Publication Data

US 2008/0122214 A1 May 29, 2008

(30) Foreign Application Priority Data

Nov. 29, 2006 (EP) .................................. 06125047

(51) Int. Cl.
*B60R 22/28* (2006.01)
(52) U.S. Cl. ..................... 280/805; 280/801.1; 280/808; 297/471; 297/483
(58) Field of Classification Search ............. 280/801.1, 280/805, 808; 297/468, 470, 471, 473, 483, 297/485, 486
See application file for complete search history.

(56) References Cited

U.S. PATENT DOCUMENTS

| | | | |
|---|---|---|---|
| 4,243,266 A | 1/1981 | Anderson | |
| 4,289,352 A | 9/1981 | Ashworth | |
| 4,710,423 A | 12/1987 | Imamura | |
| 4,840,404 A | 6/1989 | Falterman | |
| 5,160,167 A * | 11/1992 | Fourrey et al. | 280/806 |
| 5,169,174 A | 12/1992 | Gray | |
| 5,609,367 A * | 3/1997 | Eusebi et al. | 280/808 |
| 5,830,811 A | 11/1998 | Tang et al. | |
| 5,845,967 A * | 12/1998 | Kane et al. | 297/250.1 |
| 6,471,298 B2 * | 10/2002 | Carine et al. | 297/483 |

FOREIGN PATENT DOCUMENTS

| | | |
|---|---|---|
| DE | 2536665 A | 3/1977 |
| DE | 9418273 U1 | 2/1995 |
| DE | 4343867 C1 | 3/1995 |
| EP | 1134313 A2 | 9/2001 |
| EP | 1134313 A3 | 1/2004 |
| GB | 2015321 A | 9/1979 |
| KR | 10-1997-0026560 A | 6/1997 |
| KR | 20-1999-0020387 U | 6/1999 |
| KR | 10-200-0081436 A | 10/2002 |
| WO | 92/22442 A1 | 12/1992 |
| WO | 03/106230 A1 | 12/2003 |

* cited by examiner

*Primary Examiner*—Paul N. Dickson
*Assistant Examiner*—Barry Gooden, Jr.
(74) *Attorney, Agent, or Firm*—Lonnie R. Drayer; Markell Seitzman (57) ABSTRACT

A vehicle seat belt system has seat belt webbing that is attached to a tongue adapted to be located in a buckle mechanism fixed to a load-bearing part of the vehicle. A generally vertically extending strap is adapted to be located in a position against a seat back. An adjustable webbing guide connects the generally vertically extending strap to the seat belt webbing; and there is a device for positively locking the webbing guide to the generally vertically extending strap at any one of a plurality of selectable locations on the generally vertically extending strap. A load limiter is operative for a child seat occupant but not operative for an adult seat occupant.

18 Claims, 8 Drawing Sheets

SEAT BELT SYSTEM FOR A MOTOR VEHICLE

FIELD OF THE INVENTION

The present invention relates to a vehicle safety restraint, particularly a seat belt system that is suitable for restraining a child occupying a seat of a vehicle, but which can also be used for restraining adults.

BACKGROUND OF THE INVENTION

A conventional seat belt system comprises a length of seat belt webbing connected at three points to load-bearing parts of a vehicle. A lap portion of the seat belt webbing passes laterally across the hips of the seat occupant, and a torso portion of the seat belt webbing passes diagonally across the torso of the seat occupant from one hip to the opposite shoulder.

Typically one end of the seat belt webbing is attached to a sill anchor that is bolted to a load-bearing part of the vehicle on one side of the seat, usually between the seat and an adjacent door. The lap and torso portions of the seat belt webbing join at a buckle mechanism on the opposite side of the seat. The shoulder end of the seat belt webbing is attached to a seat belt retractor mounted to a load-bearing part of the vehicle, for example a side pillar or sill, or directly to a load-bearing seat, optionally via a webbing guide.

The seat belt retractor increases comfort for the seat occupant restrained by the seat belt since it allows the seat belt webbing to pay out under relatively low loads to enable limited movement of the restrained seat occupant, for example to reach entertainment controls or storage compartments. The seat belt retractor is biased to keep the seat belt webbing relatively taut about the seat occupant. A locking element locks the seat belt retractor against webbing payout in the event an acceleration sensor senses a crash.

The seat belt webbing is fastened to the buckle mechanism by a buckle tongue that is slidably attached to the seat belt webbing so that the lengths of seat belt webbing making up the lap and torso portions can easily be varied to suit the size and shape of the vehicle occupant.

Known seat belt systems of this sort tend to be unsuitable for vehicle occupants of shorter than average stature, particularly for children, because the shoulder fastening point is fixed to accommodate an average person and is fixed at or above the height of the back of the seat. This is particularly so in rear seat safety restraints. Thus the torso portion of the seat belt tends to be badly positioned for a child or short person and usually passes too close or adjacent to the child's neck. Because the child does not fit into the adult seat belt properly the child's shoulder can roll out of the seat belt during a crash effectively making the seat belt a two-point lap belt only. This is dangerous because the lap portion alone will then take more force in a crash and will be more likely to inflict injuries than when a torso belt portion is combined with the lap portion. In addition there is a danger of the child sliding under the lap portion; this is known as submarining. It is well known that children feel uncomfortable with adult seat belt restraints and often position the torso portion behind their back to reduce discomfort.

DISCUSSION OF PRIOR ART

A solution to this problem is exemplified in a product known as "The Generation Belt" which provides an additional strap that is fastened taut in a generally vertical line to the back of a vehicle seat. A shoulder support for the seat belt is slidably attached to the vertically extending strap so that its vertical position can be varied. However, the shoulder support is not retained in the desired position by anything other than friction and under high crash loads it may slide upwardly putting the shoulder support in an unsuitable and dangerous position again. "The Generation Belt" was designed for comfort rather than safety and does not comply with the latest safety regulations of which at least one is ECE 44/03.

An alternative is to use a booster seat or cushion for a child user of an adult seat belt. However the lower mass of a typical child means that insufficient force is generated during a crash for the seat belt to elongate as it would for an adult user. While the child's torso is firmly restrained, the head will swing forward to a greater extent than for an adult and will not satisfy the head injury criteria of standard safety regulations. Furthermore, the use of auxiliary child seats on public transportation, such as busses, is not always available.

SUMMARY OF THE INVENTION

According to one aspect of the present invention there is provided a seat belt system comprising a seat belt webbing that is attached to a tongue adapted to be located in a buckle mechanism fixed to a load-bearing part of the vehicle and a load limiting means which engages for a seat occupant below a predetermined height and which disengages for a seat occupant above a predetermined height. A strap extends in a generally vertical orientation against a seat back and an adjustable webbing guide is provided for connecting the generally vertically extending strap to the seat belt webbing. Means may be provided for positively locking the webbing guide to the generally vertically extending strap at any one of a plurality of selectable locations on the generally vertically extending strap. The generally vertically extending strap may comprise a lower extendable portion and an upper non-extendable portion. The extendable portions may be elastically extendable.

For a child user, the webbing guide is locked to the lower extendable portion of the strap and in a crash this portion will stretch under the force of the forward momentum of the child. For an adult user the guide is locked to the non-extendable portion and so no load limiting is applied.

An advantage of the present invention is that effectively the same seat belt can be used for both adults and children, and can comply with the safety regulations for both, for example with ECE 44.03 and ECE R16.

DETAILED DESCRIPTION OF THE INVENTION

Figure 1:
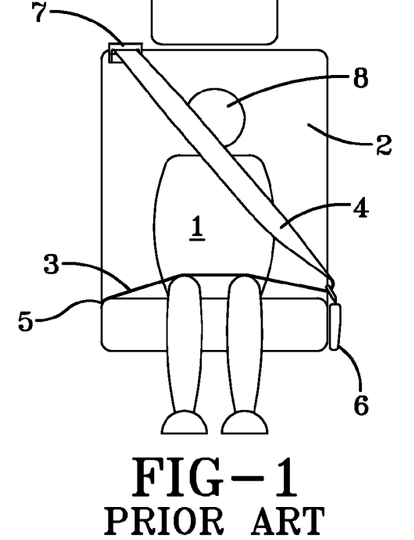
FIG. 1 is a schematic view of a small child restrained in a vehicle seat by a conventional seat belt system.

FIG. 1 is a schematic view of a small child 1 restrained in a vehicle seat 2 by a prior art conventional seat belt system. The seat belt comprises a lap portion 3 and a torso portion 4. The seat belt is attached to load-bearing parts of the vehicle at three points: a lower fixing point 5 at one side of the seat, a buckle fixing point 6 at the opposite side of the seat and an upper fixing point 7 at the top of the seat back. As can be seen in FIG. 1, a conventional seat belt places the torso portion 4 in an unsuitable position for a child 1, since it would pass across the child's head 8 or neck.

Figure 2:
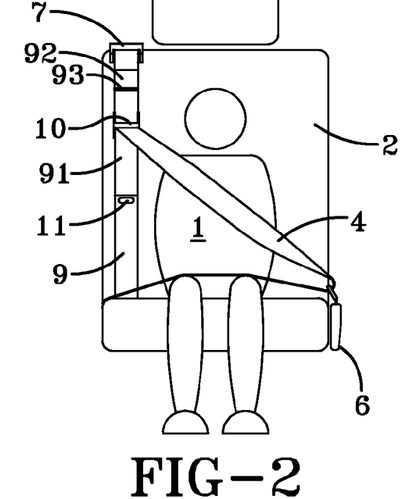
FIG. 2 is a schematic view of a small child restrained in a vehicle seat by a seat belt system according to the present invention.

In FIG. 2 a seat belt system according to the present invention is illustrated when used for a small child 1 sitting in a vehicle seat 2. The inventive seat belt system comprises a generally vertically extending strap 9 attached to the seat 2 at an upper fixing point 7 and also at a lower fixing point, so that it extends in a generally vertical orientation against the seat back of the seat 2. The generally vertically extending strap has an upper non-extendable portion 92 and a lower extendable, for example elastic, portion 91. The two portions 91, 92 may be separated by a marker line 93 as shown or may be distinguished by different colors of the strap.

According to a preferred embodiment the lower extendable portion 91 has a different color or pattern compared to the upper portion, the lower extendable portion 91 extends over a height range which corresponds to a plurality of selectable locations which are suitable for attachment of the adjustable webbing guide for a child user of the restraint, and/or the upper non-extendable portion 93 extends over a height range which corresponds to a plurality of selectable locations which are suitable for attachment of the adjustable webbing guide for an adult user of the restraint. In this way the lower child portion of the generally vertically extending belt is easily identified so that an adult user can avoid attaching the webbing guide in the lower extendable portion 91, and a child user can avoid attaching the webbing guide in the non-extendable upper portion. For example the lower extendable portion could be colored red. Alternatively marks could be made on the webbing at the boundary between the two portions.

An adjustable webbing guide 10 connects the torso portion 4 of the seat belt to the generally vertically extending strap 9, in the extendable portion 91, so as to lower the effective shoulder attachment point to a position that ensures that the torso portion 4 of the seat belt is more correctly and safely positioned to extend from the hip to the opposite shoulder of a child 1 occupying a vehicle seat. The elastic nature of the extendable portion 91 also provides a load limiting effect to reduce the extent to which a child's head swings forward in a crash.

A raised stop 11, which may be in the form of a raised plastic protrusion on the generally vertically extending strap 9, prevents further movement of the adjustable webbing guide 10 below this point on the strap 9. The stop 11 will normally be positioned at the point that meets safety regulations or legal requirements for allowable seat occupant height. The stop 11 serves as an indicator of the minimum size of occupant that can use the restraint. If the adjuster is moved to the lowest position and the occupant's shoulder is below this level then the occupant is too small for the restraint and should use an appropriate child restraint such as a child seat.

Figure 3:
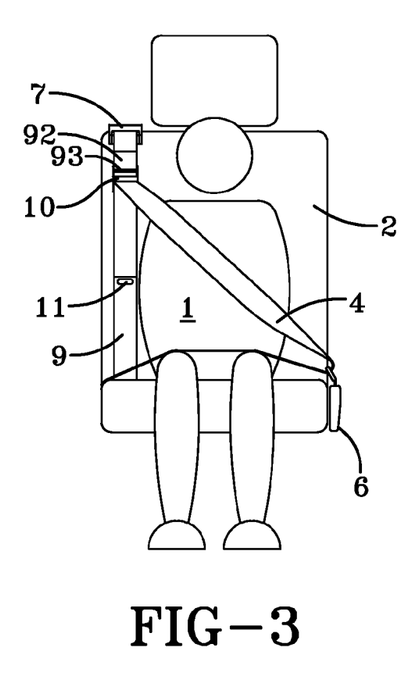
FIG. 3 is a schematic view of a larger child restrained in a vehicle seat by a seat belt system according to the present invention.

In FIG. 3 the inventive seat belt system is shown with a slightly larger child 1 occupying the seat 2. The adjustable webbing guide 10 is mounted at a higher point on the extendable portion 91 of the generally vertically extending strap 9, again ensuring that the torso portion 4 of the seat belt suitably passes from the hip of the seat occupant to the opposite shoulder as illustrated.

Figure 4:
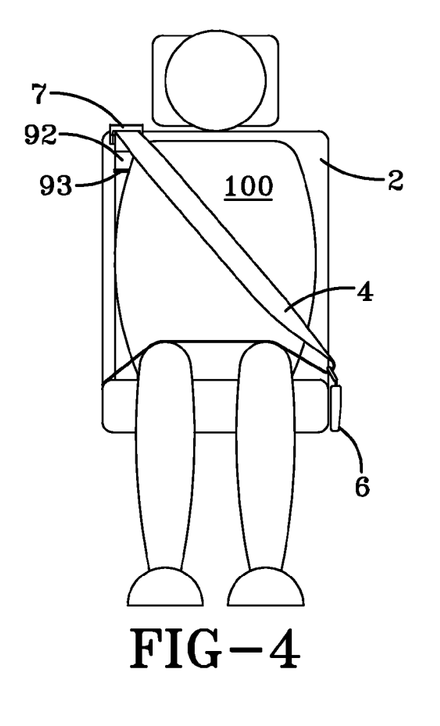
FIG. 4 is a schematic view of an adult restrained in a vehicle seat by a seat belt system according to the present invention.

In FIG. 4 an adult 100 occupies the seat 2 and in this case the adjustable webbing guide 10 is either removed altogether from the generally vertically extending strap 9 or is positioned at the non-extendable portion 92 of the generally vertically extending strap 9 so that the seat belt can be used as normal.

Figure 5:
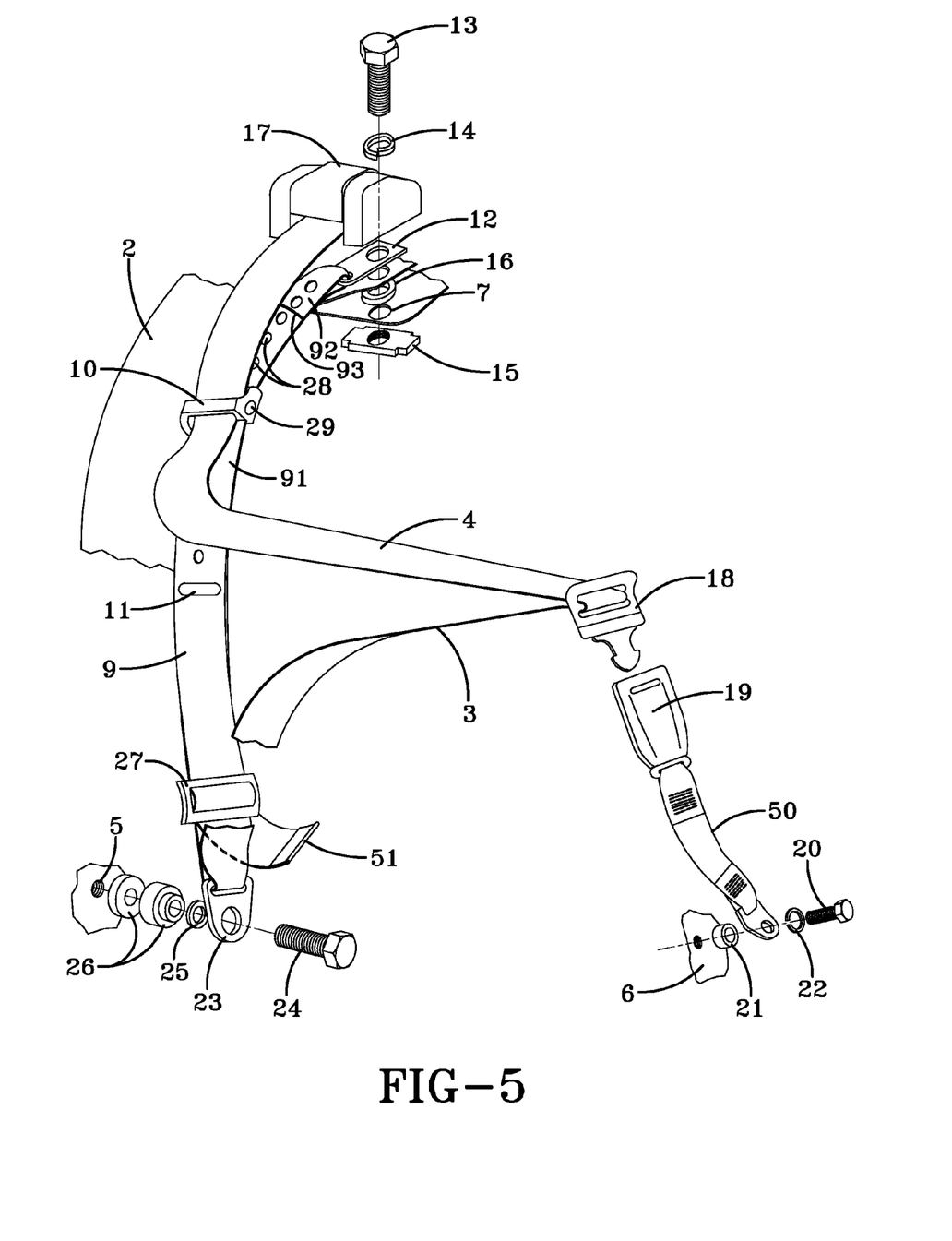
FIG. 5 is a schematic view showing the seat belt system of FIGS. 2, 3 and 4 in more detail.

FIG. 5 shows the inventive seat belt in more detail in an exploded view. At the upper fixing point 7, the generally vertically extending strap 9 is attached directly in the region of the top of the seat 2 by a bracket 12 fastened to a load-bearing part such as a parcel shelf or a load-bearing part of the seat 2 and is held in place by a retractor fixing bolt 13 passing through a washer 14 and into a tapped anchor plate 15 via a spacer 16. The bolt 13 also holds in place a seat belt retractor 17. One end of the torso portion 4 of the seat belt webbing is attached to the seat belt retractor 17. The torso portion 4 passes through the adjustable webbing guide 10 and is attached to a buckle tongue 18 that fastens into the buckle mechanism 19. The buckle mechanism 19 is attached to a length of seat belt webbing or strapping 50 to which is bolted, with bolt 20, optional spacer 21 and washer 22 to a fixing point 6 which may be in the vehicle body floor or another load-bearing part of the vehicle such as a pillar. The other end of the lap portion 3 of the seat belt is attached to the lower fixing point 5 that may be an anchor point in the doorsill or the vehicle body. The lower fixing point 5 holds not only the other end of the lap portion 3 of the seat belt but also the bottom end of the generally vertically extending strap 9 via a common fixing bracket 23 held at the fixing point 5 by a bolt 24 using a wave washer 25 and two optional spacers 26. The generally vertically extending strap 9 can be made taut between the upper and lower fixing points 5, 7 by use of an adjuster 27 and the loose end 51 of the generally vertically extending strap 9 would typically be tucked under the seat cushion.

The adjustable webbing guide 10 is located on the generally vertically extending strap 9 by engagement of a projection on the underside of the webbing guide 10 with an appropriate hole 28 in the generally vertically extending strap 9. The projection can be disengaged from the hole 28 via at least one push button 29 on the adjustable webbing guide 10. The lower limit of the position of the webbing guide 10 is determined by the stop 11.

The generally vertically extending strap 9 comprises a lower elastic portion 91 and an upper non-extendable portion 92 separated by a line 93.

Figure 6:
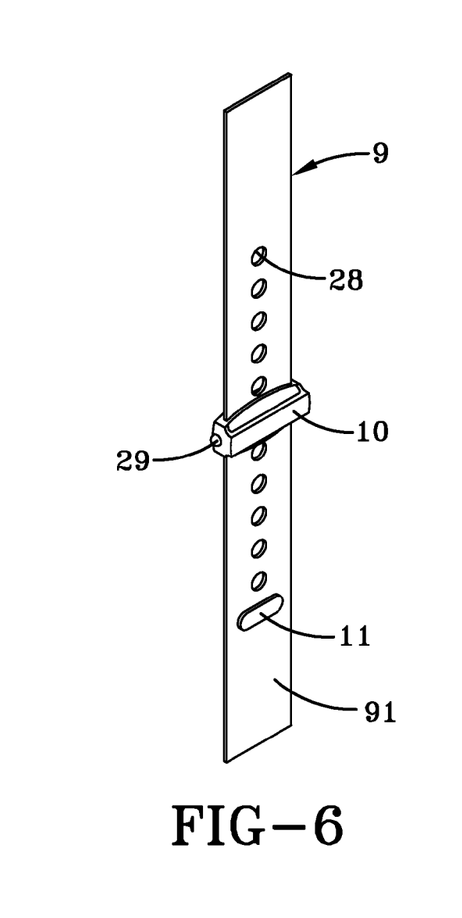
FIG. 6 is a perspective view of part of the seat belt system of FIGS. 2, 3, 4 and 5.

FIG. 6 shows a section of the extendable portion 91 of the generally vertically extending strap 9 in more detail without the seat belt webbing being shown. Like parts are numbered accordingly. Thus the adjustable webbing guide 10 is engageable with any one of the holes 28 via a projection (not shown) that is operated by at least one push button 29. The stop 11 limits the downward movement of the adjustable webbing guide 10.

Figure 7:
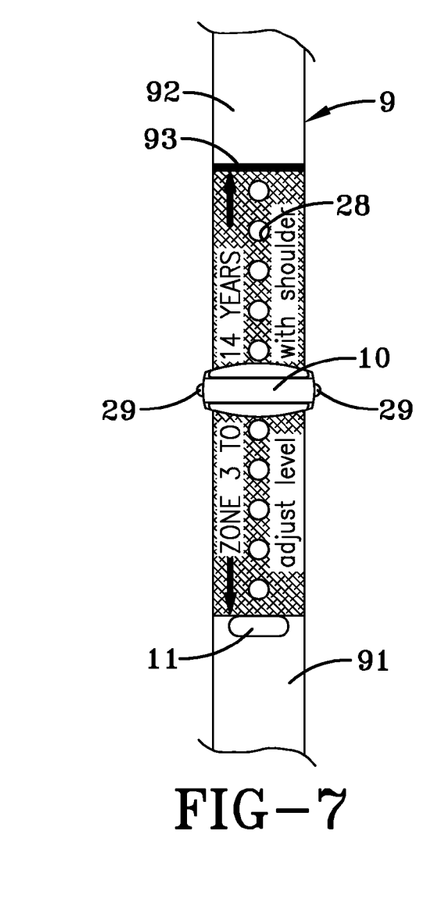
FIG. 7 is a front view of the part shown in FIG. 6.

FIG. 7 illustrates a preferred embodiment of the extendable portion 91 of the generally vertically extending strap 9 in which zones are clearly marked to define approximate regions of the generally vertically extending strap 9 in which the adjustable webbing guide 10 must be located to ensure the correct shoulder height for different age groups. In FIG. 7 it can be seen that the adjustable webbing guide 10 is positioned in "ZONE 3" which is clearly indicated as a region which would be suitable for children up to fourteen years of age. Other indicia or instructions can be incorporated into the generally vertically extending strap 9. For example in FIG. 7 the instruction "adjust level in-line with shoulder" is included, and also line 93 is shown delimiting the extendable portion 91 from the non-extendable portion 92.

Figure 8:
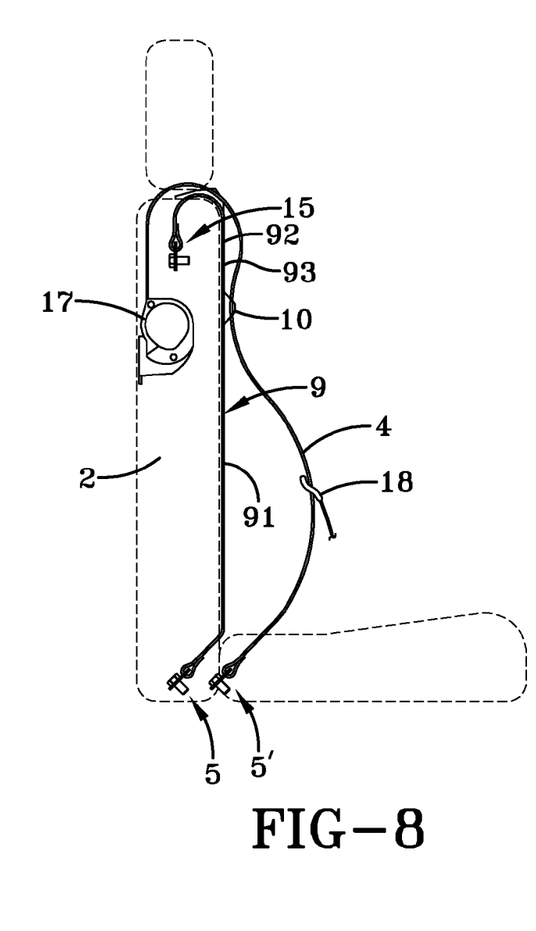
FIG. 8 is a side view of the seat belt system of FIGS. 2 to 7 attached to a seat.

FIG. 8 is a side view of part of the seat belt system of the invention. Again like parts are denoted by like reference numbers. The generally vertically extending strap 9 is anchored at its upper end in the seat back 2 via an anchor plate 15 and at its lower end by the anchor point 5 to a load-bearing part of a vehicle. The generally vertically extending strap 9 passes through a rear slot in the webbing guide 10 and the torso portion 4 of the seat belt passes through a front slot. The non-extendable portion 92 of the generally vertically extending strap 9, for adult use, is shown in the upper part and the extendable portion 91, for child use, is shown in the lower part of the drawing figure.

Figure 9:
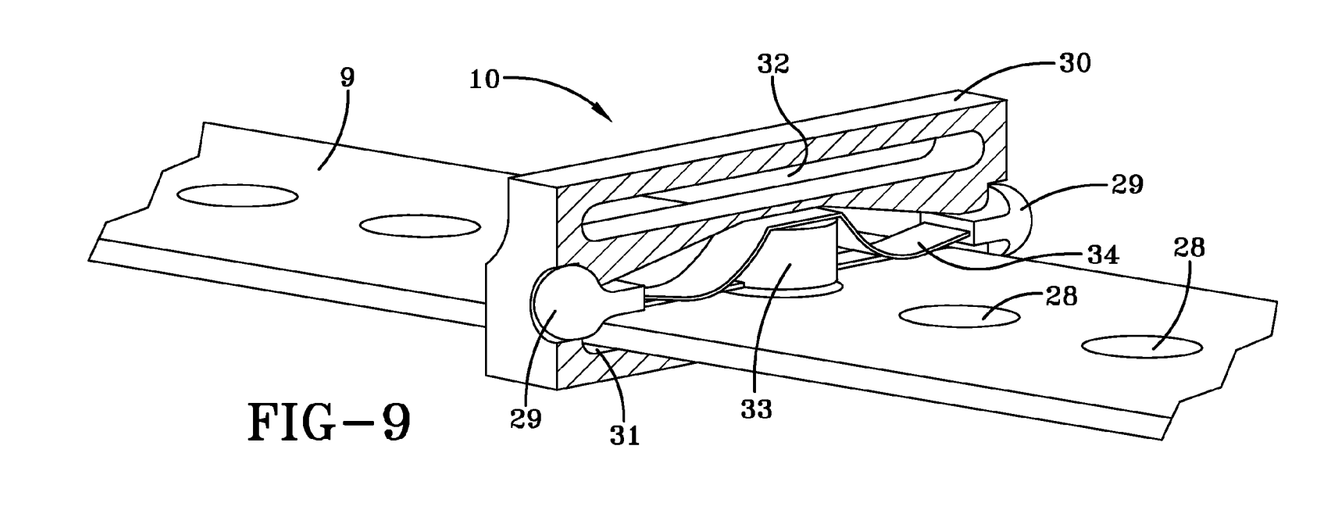
FIG. 9 is a perspective view illustrating more detail of an embodiment of an adjustable webbing guide part of the seat belt system of FIGS. 2 to 8.
Figure 10:
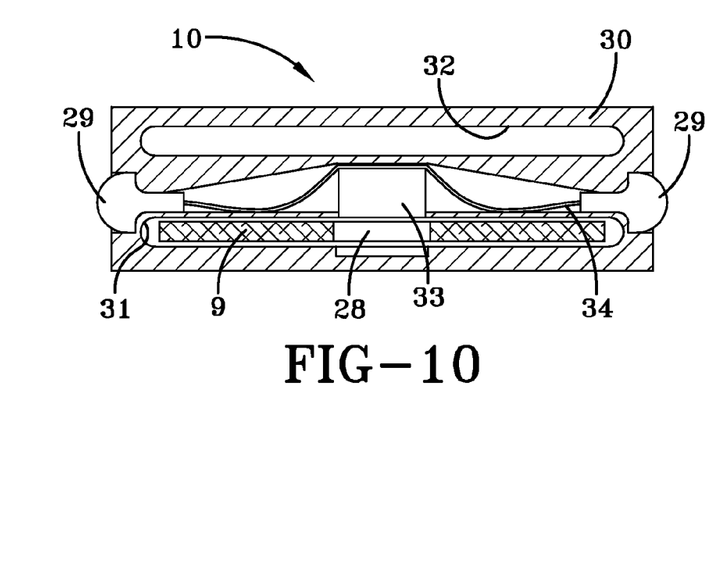
FIG. 10 is a cross-sectional view of the adjustable webbing guide of FIG. 9 in an unlocked configuration.
Figure 11:
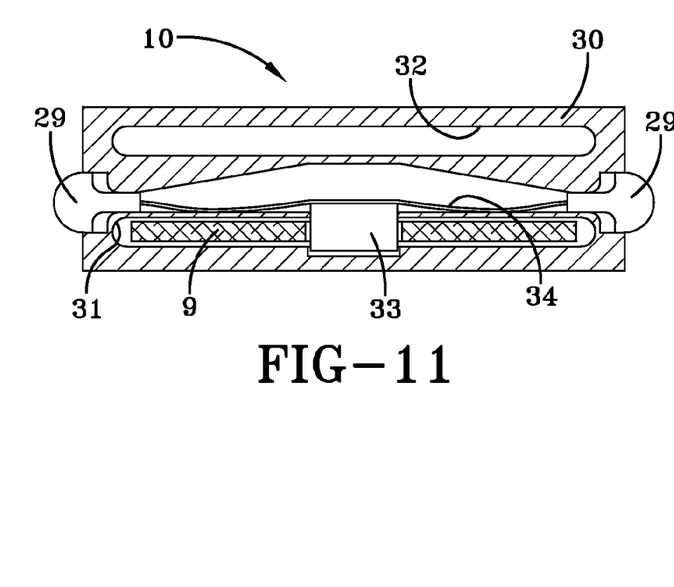
FIG. 11 is a cross-sectional view of the adjustable webbing guide of FIG. 9 in a locked configuration.

FIGS. 9, 10 and 11 illustrate an embodiment in which the webbing guide 10 comprises a housing 30 with two slots, a first slot 31 through which the generally vertically extending strap 9 passes, and a second slot 32 through which the torso portion 4 of the seat belt webbing passes. The adjustable webbing guide 10 is held in position relative to the generally vertically extending strap 9 by a retractable projection 33 that protrudes into and preferably through one of the holes 28 in the generally vertically extending strap 9. The projection 33 is attached to a leaf spring 34 that urges the projection 33 to normally protrude through the hole 28. A push button 29 is arranged on each end of the leaf spring 34. When both push buttons 29 are pressed towards each other the projection 33 rises out of the hole 28 clear of the generally vertically extending strap 9, enabling the adjustable webbing guide 10 to be moved along the generally vertically extending strap 9. This is shown in FIG. 10. When the push buttons 29 are released the projection 33 is pushed by the force of the spring 34 towards the generally vertically extending strap 9. If the projection 33 is aligned with a hole 28 then the projection 33 will protrude through the hole 28, thereby locking the adjustable webbing guide 10 in position. This is shown in FIG. 11. Preferably the stop 11 has a thickness which is greater than the width of the first slot 31 of the adjustable webbing guide to prevent movement of the adjustable webbing guide 10 on the generally vertically extending strap 9 beyond the stop 11.

In FIGS. 12 through 16 a further embodiment of the adjustable webbing guide 10 of the seat belt is shown which uses web clamping to hold the adjustable webbing guide 10 in position on the generally vertically extending strap 9. The principal of web clamping is known in the art of seat belt retractor technology in combination with seat belt retractors.

Figure 12:
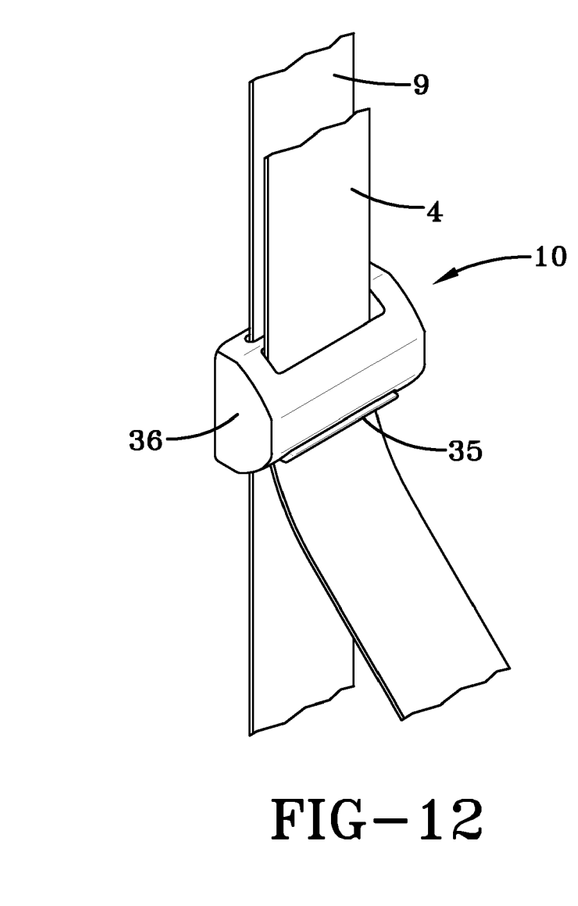
FIG. 12 is a perspective view of a second embodiment of an adjustable webbing guide of the seat belt system of FIGS. 2 to 8.
Figure 13:
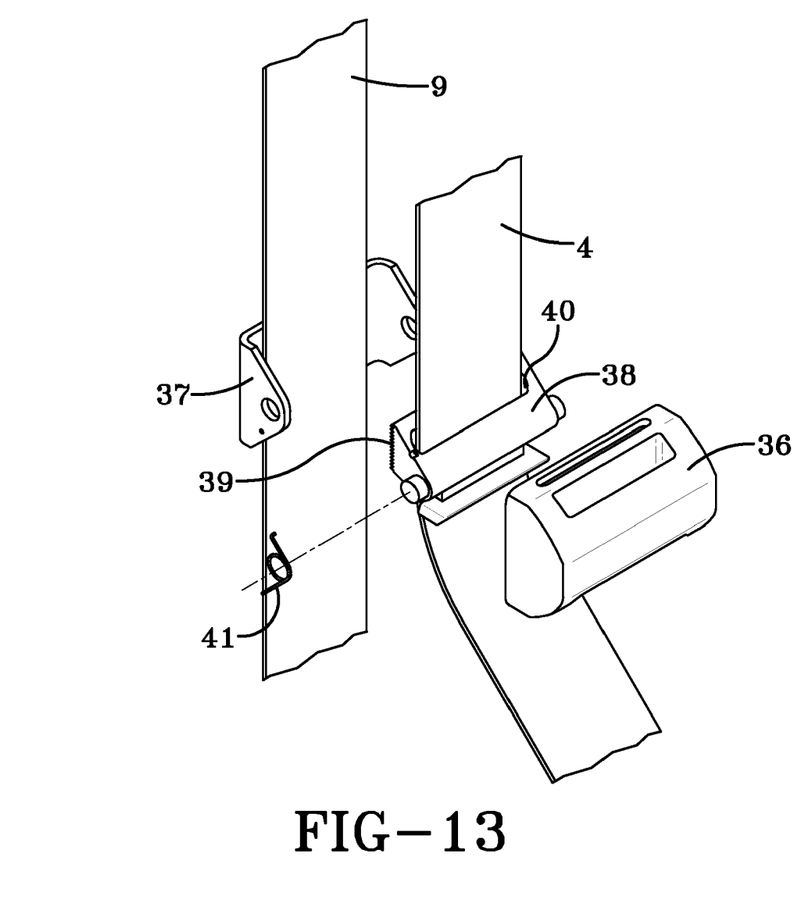
FIG. 13 is an exploded perspective view of the adjustable webbing guide shown in FIG. 12.

The adjustable webbing guide 10 comprises a cover 36, a frame 37 and a jaw 38. The jaw 38 includes a push button 35, a toothed surface 39 and a slot 40 through which the torso portion 4 of the seat belt passes. The jaw 38 is pivotally mounted to the frame 37 and spring loaded with a torsion spring 41 (FIG. 16) so that the toothed surface 39 is normally tensioned towards the frame 37. The generally vertically extending strap 9 is located between the frame 37 and the toothed surface 39 of the jaw 38 so that the adjustable webbing guide 10 is normally held in position relative to the generally vertically extending strap 9 by the clamping force between the jaw 38 and the frame 37 on the generally vertically extending strap 9.

Figure 14:
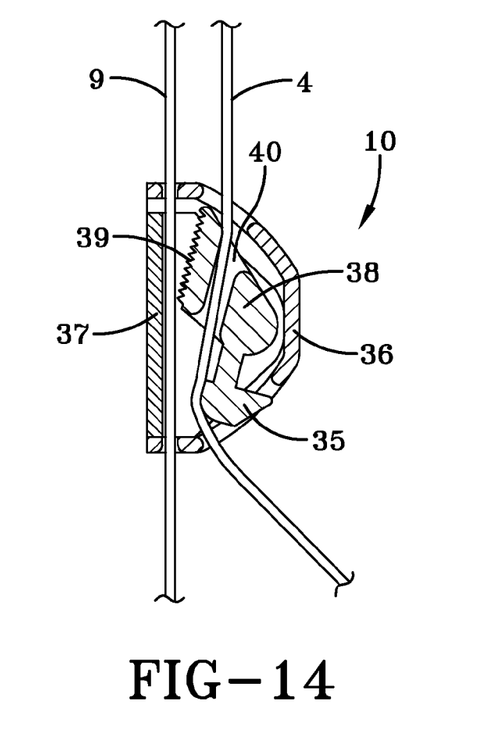
FIG. 14 is a cross-sectional view of the adjustable webbing guide shown in FIGS. 12 and 13 in an unlocked configuration.

In FIG. 14 the adjustable webbing guide 10 of FIGS. 12 and 13 is shown from the side in a cross-section view, with pressure being applied to the push button 35 of the jaw 38, such that the jaw 38 is pivoted away from the frame 37 toward the cover 36 and there is no clamping force applied to the generally vertically extending strap 9, allowing the adjustable webbing guide 10 to move longitudinally with respect to the generally vertically extending strap 9.

Figure 15:
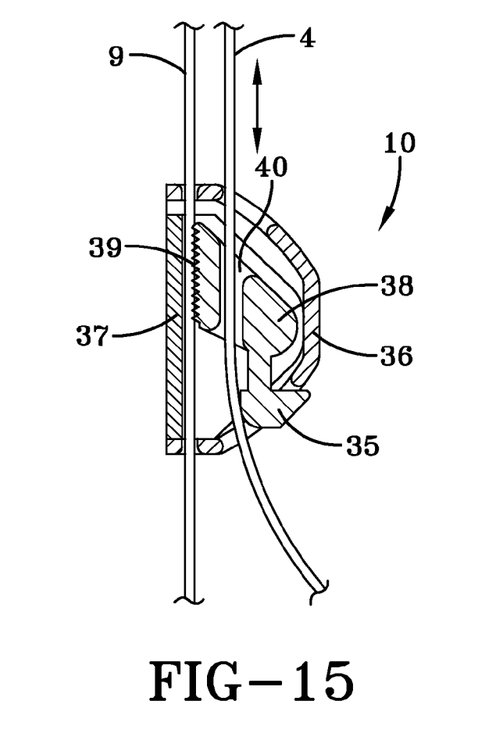
FIG. 15 is a cross-sectional view of the adjustable webbing guide of FIGS. 12 and 13 in a locked configuration.
Figure 16:
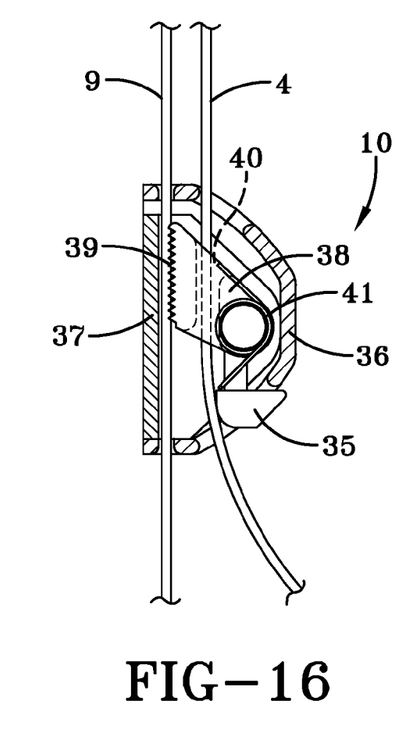
FIG. 16 is a side view of the adjustable webbing guide of FIGS. 12 and 13 in the locked configuration.

FIGS. 15 and 16 show the adjustable webbing guide 10 of FIGS. 12 and 13 when no pressure is applied to the push button 35. In FIG. 16 the torsion spring 41 provides the clamping force between the toothed surface 39 of the jaw 38 and the frame 37 so that the adjustable webbing guide 10 biased toward the generally vertically extending strap 9 and the jaw 38 is pivoted toward the frame 37 to clamp the generally vertically extending strap 9 and secure the adjustable webbing guide 10 in position.

The way in which the adjustable webbing guide 10 is locked onto the generally vertically extending strap 9 could take other forms, such as for example a toggle clamp in place of the holes punched through the webbing as illustrated. A toggle clamp is an over center linkage mechanism. When the mechanism is moved from its unlocked configuration there is a lot of movement but low force. However, when the mechanism nears the locked or clamped configuration, and the link is nearing "top dead center", for the same amount of lever movement there is significantly less movement of the clamp and the load is much greater.

Figure 17:
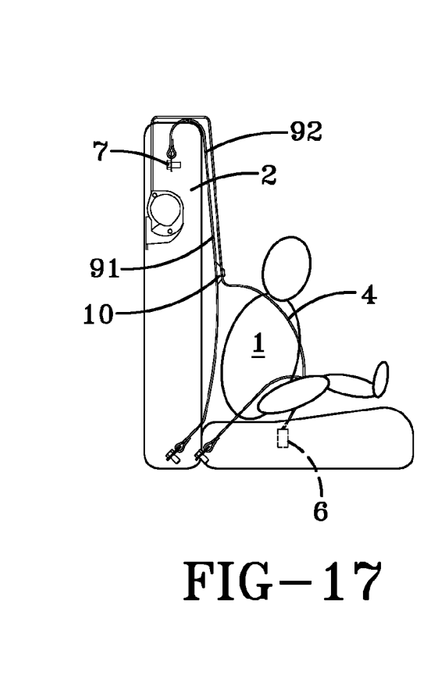
FIG. 17 is a side view showing a small child using the seat belt system of the invention.
Figure 18:
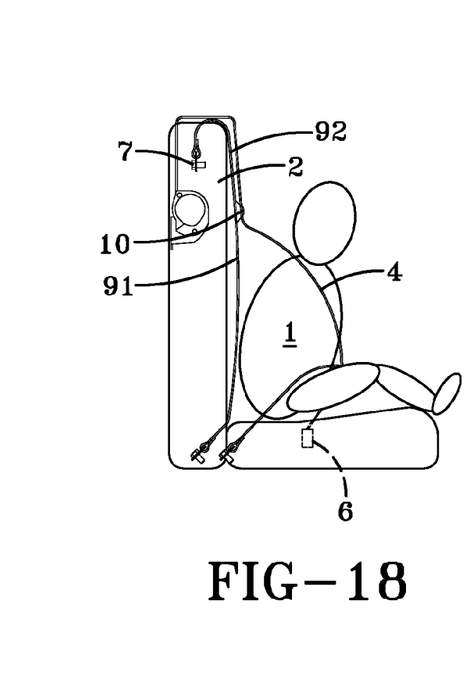
FIG. 18 is a side view showing a large child using the seat belt system of the invention.
Figure 19:
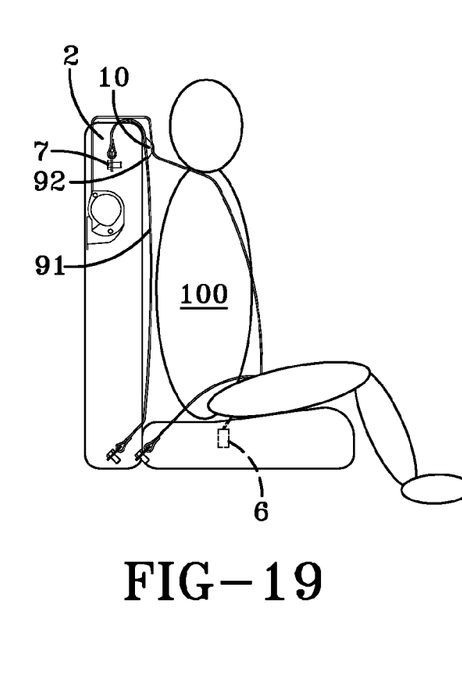
FIG. 19 is a side view showing an adult using the seat belt system of the invention.

In FIGS. 17 to 19 the inventive seat belt restraint is shown in more detail in side view. The arrangement is generally as illustrated in front view in FIGS. 2 to 4 respectively with the user 1 being a small child, typically six years old, in FIG. 17, a larger child, typically ten years old, in FIG. 18, and an adult 100 in FIG. 19.

Again the inventive seat belt comprises a generally vertically extending strap 9 attached to the seat 2 at upper and lower fixing points and a conventional seat belt with a torso portion 4 connected to the generally vertically extending strap 9 by an adjustable webbing guide 10 to lower the effective shoulder attachment point to a suitable position for the height and/or weight of the child 1.

In FIGS. 17 to 19 it can clearly be seen that the generally vertically extending strap 9 comprises two sections 91, 92. The lower section 91 is formed of extendable material such as will extend elastically or alternatively plastically under a predetermined force. The upper section 92 is non-extendable, for example conventional seat belt webbing material.

Extendable webbing for safety restraint seat belts usable for the lower extendable portion 91 is disclosed for example in EP 01302041, U.S. Pat. No. 4,710,423 and U.S. Pat. No. 5,830,811, all of which are incorporated herein in their entirety for the purpose of teaching extendable seat belt webbing that can be used in the practice of the present invention. Such elongatable webbing can be woven, knitted or sewn to conventional non-extendable webbing to make a generally vertically extending strap according to the invention.

For a child user 1 as shown in FIGS. 17 and 18, the adjustable webbing guide 10 is attached to the lower extendable portion 91. In a crash the momentum of the seat occupant exerts a force via the webbing guide on the extendable portion 91 of the generally vertically extending strap 9 and causes it to elongate allowing the seat occupant 1 to move forward relative to the seat 2 a relatively small distance and in a controlled manner. This has the effect of avoiding an abrupt restraining force on the seat occupant 1, i.e. it applies a load limiting effect, and the child 1 occupying the seat is brought to a stop more gently than if the strap section 91 were not extendable. Such a load limiting effect is well known to reduce injuries caused by a belt restraint itself and to reduce head and neck injuries.

For a slightly larger and heavier child 1 occupying the vehicle seat as shown in FIG. 18, the adjustable webbing guide 10 is again fastened to the extendable section 91 of the generally vertically extending strap 9 but at a higher position. This automatically reduces the effective length of extendable strap and thus reduces the distance that the larger child will move forward under the load limiting effect in a crash, thus automatically compensating for the additional mass of the larger child. It can be seen that the maximum extendibility of the generally vertically extending strap 9 is reached when the webbing guide 10 is at the midpoint of the extendable section 91.

For an adult 100 shown in FIG. 19, the adjustable webbing guide 10 is fastened to the strap 9 in the upper non-extendable section 92 and thus no load limiting is effected by the generally vertically extending strap and the adult occupying the vehicle seat is also automatically securely and safely restrained in a crash, in a manner which better suits the height and mass of the adult user.

Figure 20:
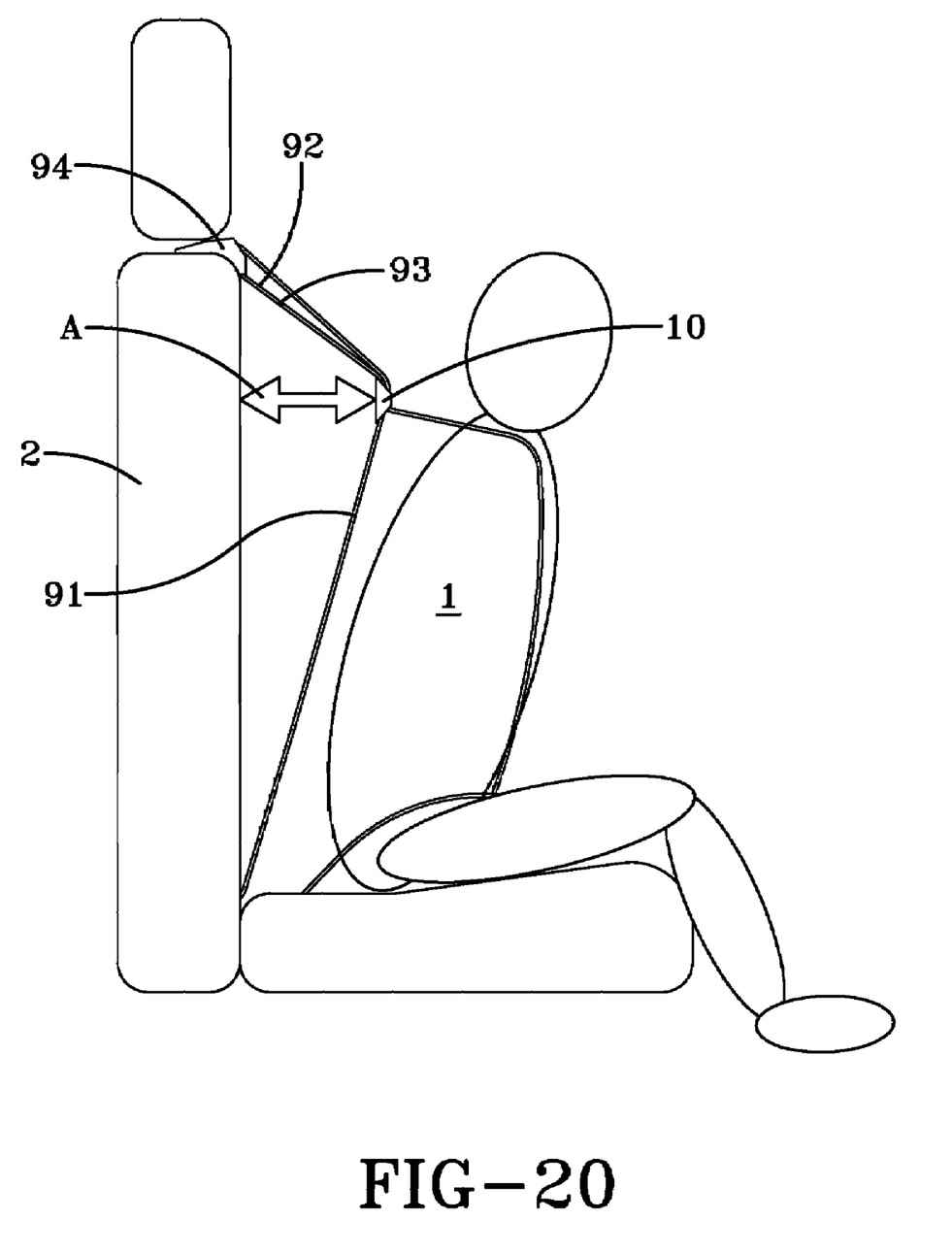
FIG. 20 is a side view of an embodiment of the invention with a child occupying a seat and moving forward as during a rapid deceleration of a vehicle.

In FIG. 20 a child 1 is shown restrained by the seat belt system of the invention. Like parts are denoted by like reference numbers and it can clearly be seen that the load limiting feature of the invention allows the adjustable webbing guide 10 to move forward from the seat back 2 by a distance A thus reducing head acceleration.

For an adult the adjustable webbing guide will be fastened to the non-extendable portion 92 of the seat belt webbing and will not move substantially forward. Alternatively it could be housed in the upper webbing guide 94 achieving the same effect.

Such a seat belt system provides a secure safe and comfortable means of restraining either adults or children of different sizes, without requiring complex adjustments or the addition or removal of additional items such as booster seats. The load-limiting feature automatically engages for a seat occupant below a predetermined height and automatically disengages for an occupant above the predetermined height.

The load limiting effect for a child user may be provided in other ways such as using seat belt webbing which is adapted to tear for the extendable portion 91 such as by including one or more sections where the seat belt webbing is folded and stitched with stitches that are designed to break under a predetermined tension so that the seat belt webbing elongates. Alternatively load limiting can comprise incorporating an expanding anchorage bracket such that the bracket comprises a slot in which the anchor bolt can move under a predetermined tension. Another alternative is a collapsible bush or strong compression spring between the bolt and the bracket that will compress under a predetermined force. It would also be possible to use a torsion bar in the arrangement to achieve a load limiting effect. The back portion of seat belt webbing can have completely detachable anchorages from the seat belt retractor assembly.

Typically this invention provides a child safety restraint for the three to fourteen year old age range. It can be used with or without a booster cushion or booster seat and would therefore be particularly suitable for minibuses so that adults can still use the safety restraint.

While specific preferred embodiments and materials have been illustrated, described and identified, it is to be understood that the invention is in no way limited thereto since modifications may be made and other embodiments of the invention will occur to those of skill in the art to which this invention pertains. Thus, it is intended to cover any such modifications and other embodiments as incorporated the features of this invention within the full lawful scope of the allowed claims as follows:

The invention claimed is:

1. A vehicle seat belt system comprising a seat belt webbing which is attached to a tongue that fastens into a buckle mechanism fixed to a load-bearing part of the vehicle;
a generally vertically extending strap located in a position against a seat back of a vehicle seat, a first end of the generally vertically extending strap is attached to the seat back at an upper fixing point and a second end of the generally vertically extending strap is attached at a lower fixing point;
an adjustable webbing guide for connecting the generally vertically extending strap to seat belt webbing;
a means for positively locking the adjustable webbing guide to the generally vertically extending strap at any one of a plurality of selectable locations on the generally vertically extending strap;
wherein the generally vertically extending strap has an upper part of the strap comprised of a conventional seat belt webbing material and a part of the strap located below the conventional seat belt webbing material comprised of an extendable seat belt webbing material;
wherein the adjustable webbing guide is attached to the extendable seat belt webbing material when a child occupies the vehicle seat.

2. The vehicle seat belt system according to claim 1 wherein the extendable portion of the generally vertically extending strap is elastically extendable.

3. The vehicle seat belt system according to claim 1 wherein the extendable portion of the generally vertically extending strap has a different color or pattern compared to the upper section.

4. The vehicle seat belt system according to claim 1 wherein the extendable portion of the generally vertically extending strap provides a plurality of selectable locations which are suitable for attachment of the adjustable webbing guide for a child user of the restraint, and the upper non-extendable portion of the generally vertically extending strap provides to a plurality of selectable locations which are suitable for attachment of the adjustable webbing guide for an adult user of the restraint.

5. The vehicle seat belt system according claim 1 wherein the adjustable webbing guide comprises a first slot to accommodate the generally vertically extending strap and a second slot to accommodate the seat belt webbing.

6. The vehicle seat belt system according to claim 1 wherein the generally vertically extending strap comprises markings defining regions on the generally vertically extending strap in which the adjustable webbing guide should be located indicative of the correct positioning of the adjustable webbing guide in dependence upon at least one of the age of a user of the seat belt system and the height of a user of the safety restraint.

7. The vehicle seat belt system according to claim 1 wherein the generally vertically extending strap comprises means to define a lower limit for movement of the adjustable webbing guide on the generally vertically extending strap.

8. The vehicle seat belt system according to claim 7 wherein the means to define a lower limit for movement of the adjustable webbing guide comprises a raised stop located on the generally vertically extending strap.

9. The vehicle seat belt system according to claim 8 wherein the raised member has a thickness which is greater than the width of the first slot of the adjustable webbing guide to prevent movement of the adjustable webbing guide on the generally vertically extending strap beyond the stop.

10. The vehicle seat belt system according to claim 1 wherein the generally vertically extending strap has a plurality of holes therein, and the adjustable webbing guide comprises a retractable projection sized to be insertable through any one of the holes to lock the adjustable webbing guide to the generally vertically extending strap.

11. The vehicle seat belt system according to claim 10 wherein the retractable projection is retractable by means of one or more push buttons, and is biased to an unretracted configuration by a spring.

12. The vehicle seat belt system according to claim 1 wherein the adjustable webbing guide comprises a web clamp that positively engages the generally vertically extending strap to lock the adjustable webbing guide to the generally vertically extending strap.

13. The vehicle seat belt system according to claim 12 wherein the jaw comprises a toothed surface facing toward the generally vertically extending strap.

14. The vehicle seat belt system according to claim 12 wherein the web clamp comprises a jaw, and a frame, wherein the jaw is pivotally mounted and spring loaded so that the jaw is normally tensioned towards the frame exerting a clamping force on the generally vertically extending strap between the jaw and the frame.

15. The vehicle seat belt system according to claim 14 wherein the jaw is pivotable away from the frame by means of a push button connected to the jaw, to release the clamping force on the generally vertically extending strap.

16. A vehicle seat belt system comprising:
a seat belt webbing which is attached to a tongue that fastens into a buckle mechanism fixed to a load-bearing part of the vehicle;
a generally vertically extending strap located in a position against a seat back of a vehicle seat, a first end of the generally vertically extending strap is attached to the seat back at an upper fixing point and a second end of the generally vertically extending strap is attached at a lower fixing point, an upper part of the strap comprises a conventional seat belt webbing material and a part of the strap located below the conventional seat belt webbing material comprises an extendable seat belt webbing material;
an adjustable webbing guide for connecting the generally vertically extending strap to seat belt webbing, the adjustable webbing guide comprises a first slot to accommodate the generally vertically extending strap and a second slot to accommodate the seat belt webbing;
a means for positively locking the adjustable webbing guide to the generally vertically extending strap at any one of a plurality of selectable locations on the generally vertically extending strap;
wherein the adjustable webbing guide is attached to the extendable seat belt webbing material when a child occupies the vehicle seat.

17. A vehicle seat belt system comprising:
a seat belt webbing which is attached to a tongue that fastens into a buckle mechanism fixed to a load-bearing part of the vehicle;
a generally vertically extending strap located in a position against a seat back, a first end of the generally vertically extending strap is attached to the seat back of a vehicle seat at an upper fixing point and a second end of the generally vertically extending strap is attached at a lower fixing point, an upper part of the strap comprises a conventional seat belt webbing material and a part of the strap located below the conventional seat belt webbing material comprises an extendable seat belt webbing material;
an adjustable webbing guide for connecting the generally vertically extending strap to seat belt webbing, the adjustable webbing guide comprises a first slot to accommodate the generally vertically extending strap and a second slot to accommodate the seat belt webbing;
the generally vertically extending strap has a plurality of holes therein, and the adjustable webbing guide comprises a retractable projection sized to be insertable through any one of the holes to lock the adjustable webbing guide to the generally vertically extending strap;
wherein the adjustable webbing guide is attached to the extendable seat belt webbing material when a child occupies the vehicle seat.

18. A vehicle seat belt system comprising:
a seat belt webbing which is attached to a tongue that fastens into a buckle mechanism fixed to a load-bearing part of the vehicle;
a generally vertically extending strap located in a position against a seat back, a first end of the generally vertically extending strap is attached to the seat back of a vehicle seat at an upper fixing point and a second end of the generally vertically extending strap is attached at a lower fixing point, an upper part of the strap comprises a conventional seat belt webbing material and a part of the strap located below the conventional seat belt webbing material comprises an extendable seat belt webbing material;
an adjustable webbing guide for connecting the generally vertically extending strap to seat belt webbing, the adjustable webbing guide comprises a first slot to accommodate the generally vertically extending strap and a second slot to accommodate the seat belt webbing, the adjustable webbing guide comprises a web clamp that positively engages the generally vertically extending strap to lock the adjustable webbing guide to the generally vertically extending strap;
wherein the adjustable webbing guide is attached to the extendable seat belt webbing material when a child occupies the vehicle seat.

* * * * *